Patented May 4, 1943

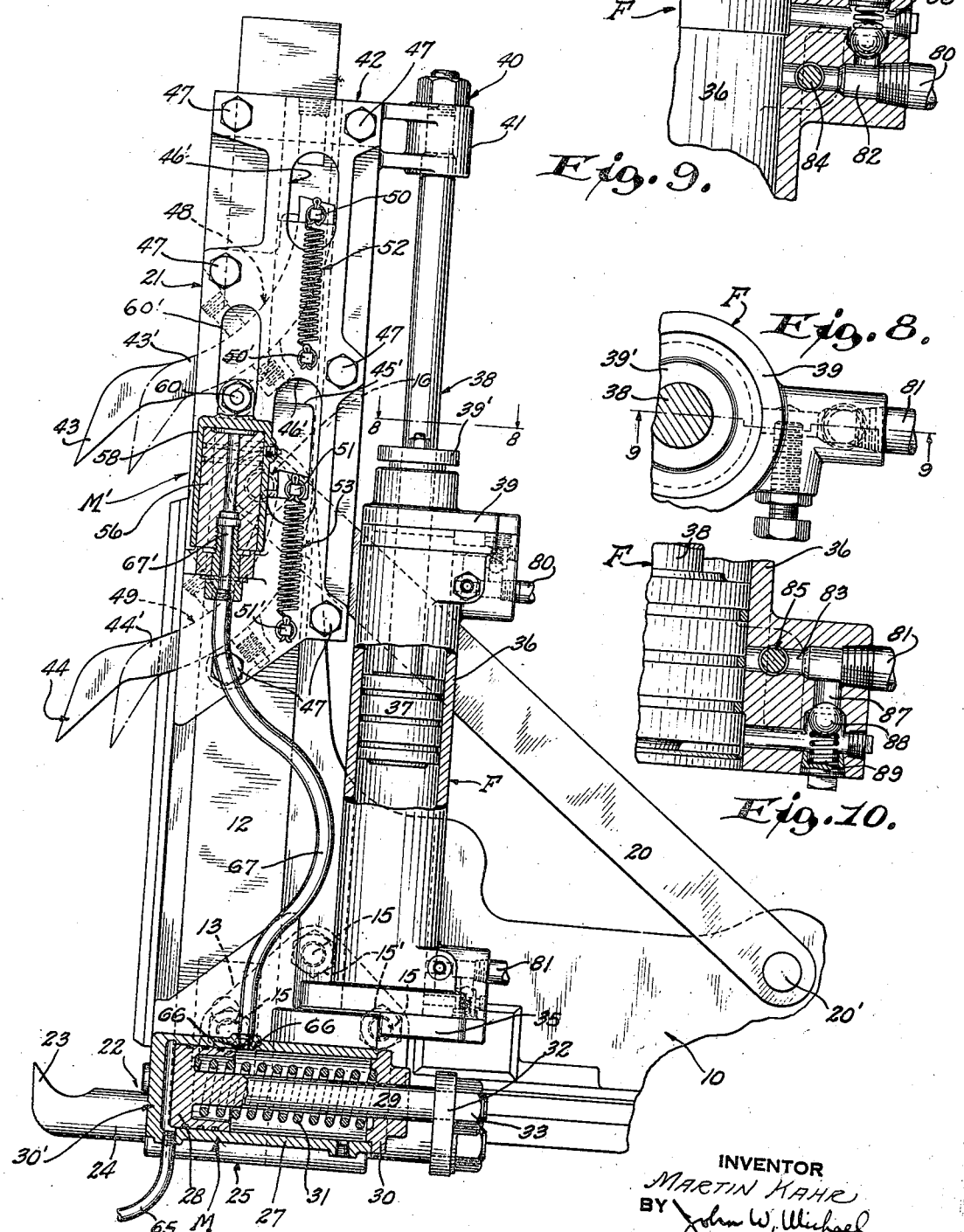

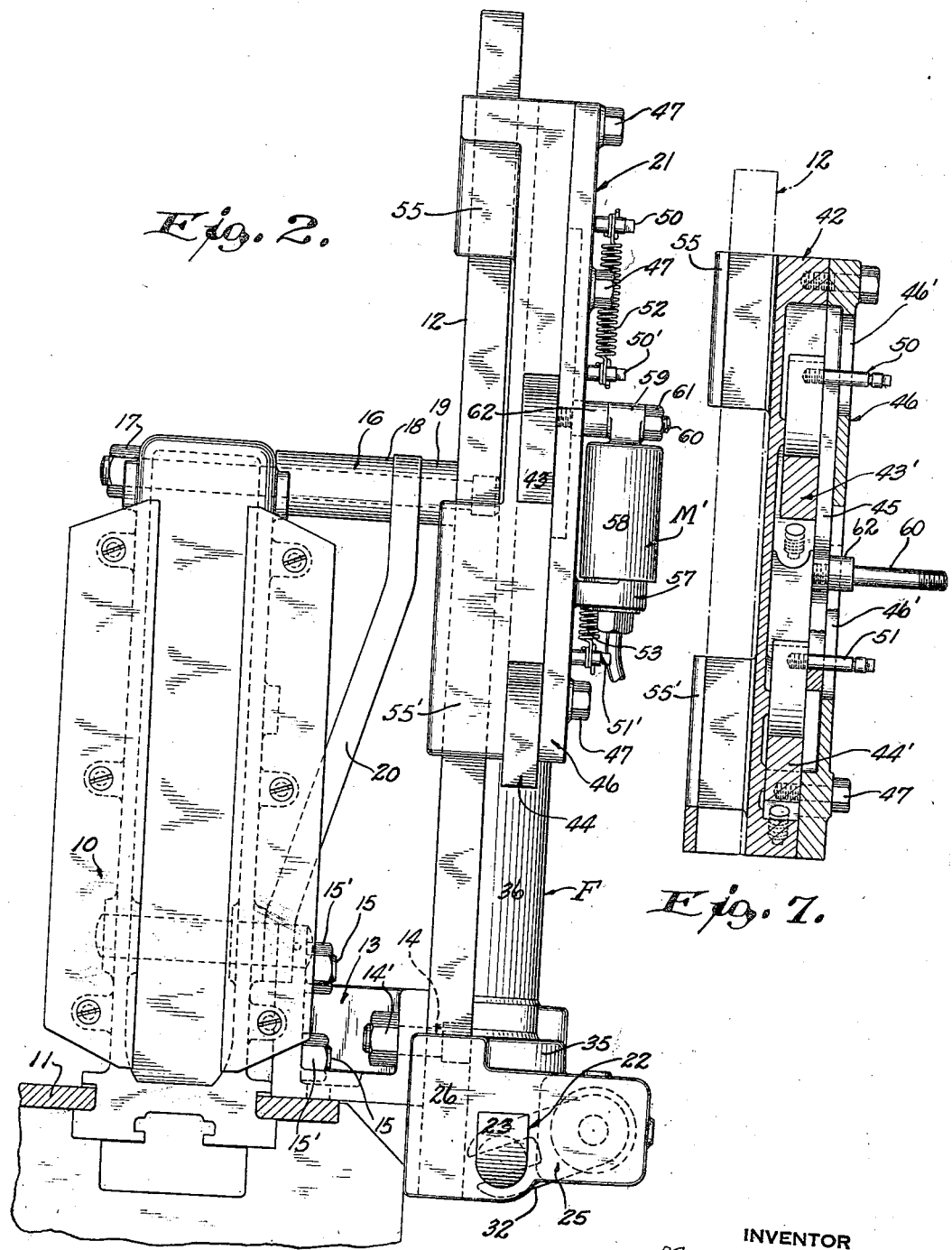

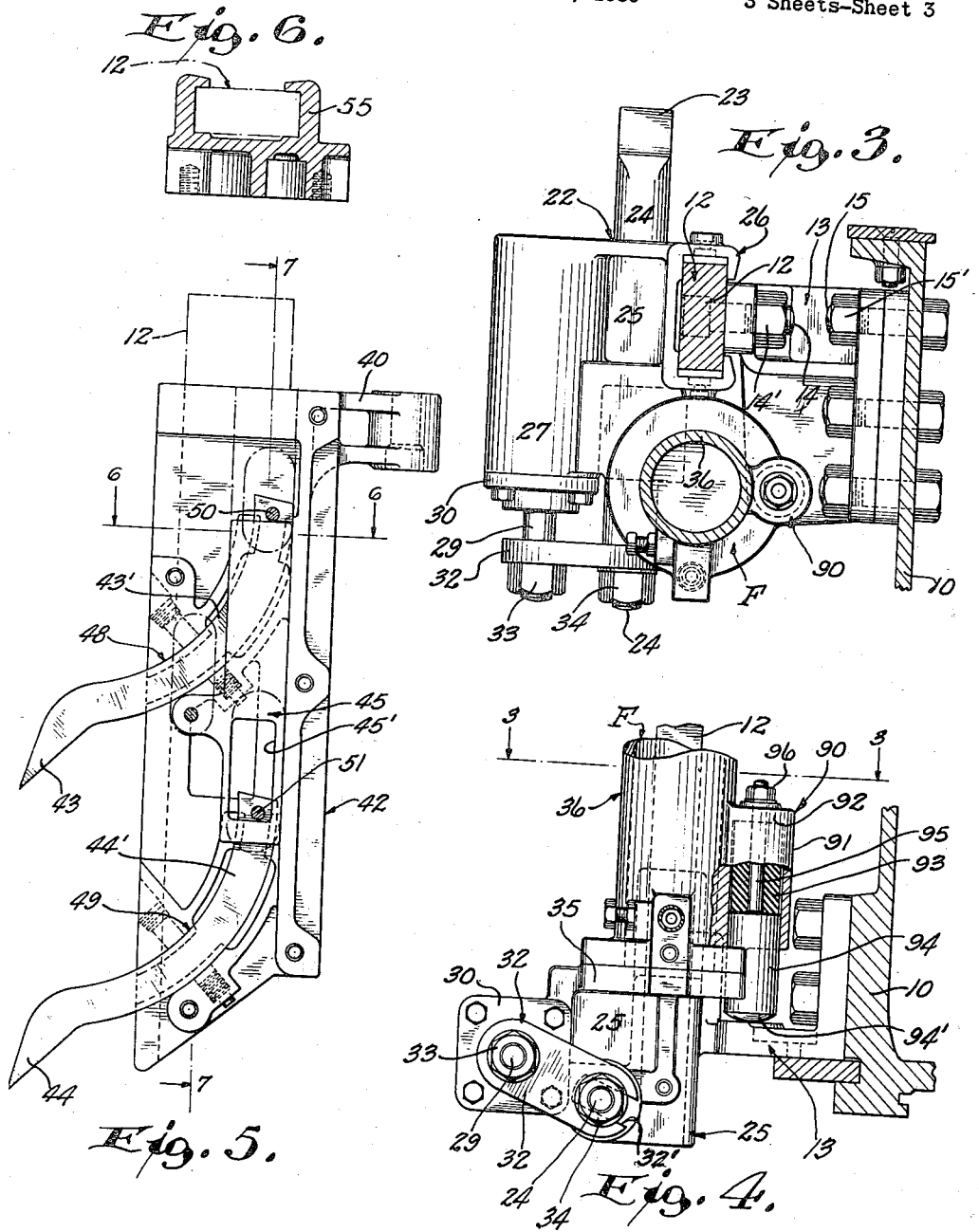

2,318,163

UNITED STATES PATENT OFFICE 2,318,163

SAW MILL DOG

Martin Kahr, Milwaukee, Wis., assignor to The Filer & Stowell Co., Milwaukee, Wis., a corporation of Wisconsin Application November 17, 1939, Serial No. 304,976

3 Claims. (Cl. 143—125)

This invention relates to an improvement in saw mill dogs for use in holding a log or piece of lumber in position against the faces of the knees of a saw mill carriage.

Saw mill dogs of the type here contemplated usually comprise a lower tooth or log-holding member, and one or more upper teeth, the upper and lower teeth being so supported and mounted on the knee as to be capable of movement toward and away from each other to engage and disengage the log and also being movable inwardly and outwardly transversely with respect to the face of the knee so as to better adapt them to grip and hold various sizes of logs and planks. Usually the modern dogs of this type are motor-operated, that is, either electric or fluid pressure motors are combined with the dogs to effect their several motions. Separate motors are frequently employed for the upper and lower dog teeth. The lower tooth is not always within the field of vision of the sawyer, and for this reason, and also because of the rapidity with which the various operations are carried out, the sawyer at times is mistaken as to the position of the lower dog teeth and mistakenly assumes that because the upper dog teeth are retracted or pulled inwardly as far as they may be that the lower dog is similarly positioned, whereas in fact it may be in its projected or outermost position. A mistake of this kind is frequently serious because of the fact that the lower dog may, when projected, be run into the saw, damaging the machinery, and sometimes injuring or killing the attendants.

One of the objects of the present invention is to so constitute the operating mechanism for the dogs as to interlock them and make it impossible for the upper dog teeth to be retracted until after the lower dog tooth has been pulled inwardly, thereby precluding the possibility of the lower tooth being run into the saw.

Another object of the invention is to provide a saw mill dog having this advantage and which is simple and durable in its construction, closely organized, reliable and efficient in operation, and easy and comparatively inexpensive to manufacture and install on a saw mill carriage.

A further object of the invention is to provide a saw mill dog, which is so constituted as to make practical very rapid operation, and this in such a way as not to damage the lumber being cut. This purpose is accomplished by throttling the exhaust so as to obtain a fast up stroke and a relatively slow down stroke.

Other objects and advantages reside in certain novel features of the construction, arrangement, and combination of parts which will be hereinafter more fully described and particularly pointed out in the appended claims, reference being had to the accompanying drawings forming a part of this specification, and in which:

Figure 1 is a view partly in side elevation and partly in vertical cross section showing a saw mill dog embodying the present invention applied to a knee of a saw mill carriage.

Figure 2 is a view in front elevation of the structure shown in Figure 1.

Figure 3 is a view in horizontal cross section taken on line 3—3 of Figure 4.

Figure 4 is a fragmentary view partly in rear elevation and partly in vertical cross section showing the lower dog and the elements associated therewith.

Figure 5 is a view in elevation showing the upper dogs and their case with the face plate of the case removed for purposes of illustration.

Figure 6 is a view in horizontal cross section, taken on line 6—6 of Figure 5.

Figure 7 is a view in vertical cross section, taken on line 7—7 of Figure 5, and with parts shown in elevation for the sake of illustration.

Figure 8 is a fragmentary view in horizontal section taken on line 8—8 of Figure 1.

Figure 9 is a fragmentary view in vertical section taken on line 9—9 of Figure 8 and illustrating the valve structure at the upper end of the fluid pressure motor employed for the purpose of moving the dogs toward and away from each other, parts being shown in elevation for the sake of simplicity in illustration.

Figure 10 is a fragmentary view similar to Figure 9 and showing the valve structure provided at the lower end of the fluid pressure motor which moves the dogs toward and away from each other.

Referring to the drawings, the numeral 10 designates one of the knees of a saw mill carriage. The knee 10 is supported in any standard or conventional way on the saw mill carriage, a fragment of which is shown at 11 of Figure 2.

The saw mill dogs, and the motors for operating them, are all supported on a vertical dog bar 12. The lower end of this dog bar 12 is suitably secured to the knee. For example, the lower end of the dog bar 12 may be bolted to a bracket 13 by means of a bolt 14 and nut 14', and the bracket 13 in turn is bolted to the knee by bolts 15 and nuts 15'. The head of the bolt 14 is countersunk in the dog bar so as to offer no obstruction. The dog bar 12 is further suitably supported and braced, as, for instance, by means of a bolt 16 having its head countersunk in the dog bar 12 and secured to the knee by passing through an opening therein, and by means of a nut 17. Spacers 18 and 19 are provided on the bolt 16 and secure between them the upper apertured end of a brace bar 20 which angles rearwardly and downwardly and is fastened at its lower end to the knee, as at 20'. In this way the dog bar 12 is rigidly secured to one side of the knee in a vertical position.

An upper dog, designated generally at 21, and a lower dog, designated generally at 22, are supported on the dog bar 12 for vertical movement toward and away from each other and into and out of engagement with the log or lumber being cut.

The lower dog 22 comprises a case or frame 25 provided with a flanged channel formation 26 constituting a guide structure which slidably embraces the lower end portion of the dog bar 12 and constrains the dog frame to sliding movement vertically of said dog bar. In the construction shown the flanged channel formation 26 is constituted as an integral part of the dog case 25 (see Figure 3).

The log-engaging element of the lower dog 22 comprises an upwardly directed dog tooth 23 integrally formed with the outer end of a slide bar 24 fitted for sliding movement in a horizontal bearing opening or bore provided therefor in the dog case 25. When the bar 24 slides back and forth in its bearing in the dog case 25 it moves the dog tooth 23 in and out relative to the face of the knee 10.

A fluid pressure motor, designated generally at M, is combined with the dog frame 25 for sliding the bar 24 back and forth and consequently shifting the dog tooth 23 transversely or in and out relative to the face of the knee 10.

In the construction illustrated, the fluid pressure motor M includes a cylinder 27 formed as an integral part of the dog case 25. In fact, and as illustrated in the drawings, the case or frame 25 of the lower dog 22, its flanged channel guide formation 26, and the cylinder 27 of the fluid pressure motor M may all be constituted as parts of a single casting.

A piston 28 is fitted in the cylinder 27 and has a piston rod 29 extending through a stuffing box in the detachable head 30 of the cylinder 27. The end of cylinder 27 opposite detachable end head 30 is closed by an integral end head 30'. A spring 31 surrounds the piston rod and is interposed upon one side of the piston and the head 30 and tends to bias the piston to the position shown in Figure 1.

The rear end of the piston rod 29, which projects beyond its cylinder 27, is reduced, shouldered, and externally threaded, and extends through an opening provided therefor in one end of a cross head 32. A nut 33 completes the fastening of the reduced and threaded end of the piston rod 29 to end of the cross head 32 interfitted therewith. The cross head 32 has the end thereof opposite the one connected to the piston rod 29 suitably interconnected to the rear end of the slide bar 24 on which the lower dog 23 is formed, this rearward end of the bar 24 also projecting rearwardly beyond the lower dog casing 25.

In the construction illustrated (Figures 1, 2, 3, and 4) a driving connection is established between the cross head 32 and the slide bar 24 by slotting one end of the cross head, as at 32', and hence providing a yoke formation which straddles the reduced and flattened rear end of bar 24 and abuts the shoulder formed at the juncture of the reduced and main portion of bar 24 and is held thereon by nut and washer 34.

In this way the slide bar 24 and its dog tooth 23 are both controlled as to in and out position by the position of the piston 28 so that when the piston is forced rearwardly the dog tooth 23 is pulled in toward the face of the knee, whereas the piston 28 moves outwardly and the dog tooth moves outwardly relative to the knee face.

A fluid pressure motor F is provided between the upper dog 21 and the lower dog 22 for the purpose of moving the dogs toward and away from each other in a vertical plane, and consequently, in the practical operation of the machine, engaging and disengaging the dogs with the log or board being sawed.

The lower dog casing 25 is preferably constituted and machined to provide the lower end head 35 for the vertical cylinder 36 of the fluid pressure motor F, the lower end of the cylinder 36 being engaged with and bolted or otherwise suitably secured to the end head structure 35. A piston 37 is fitted in the cylinder 36 for reciprocatory movement, and is fixed to the lower end of the piston rod 38 which projects up through a stuffing box 39' provided on the upper end of head 39 of the cylinder 36. The upper end of the piston rod 38 is fastened, as at 40, to a lug 41, which is integral with or otherwise suitably fixed to and projects rearwardly from the body of the case 42 of the upper dog 21.

The case 42 is fashioned to provide the guides or mountings and a major element of the enclosure for the upper dog teeth 43 and 44 and their operating bar 45. The enclosure of the teeth 43 and 44, and their operating bar 45, is completed by the provision of a removable and appropriately slotted face plate 46, which in the assembly is fastened to the body of the case 42 by stud bolts 47.

The upper dog teeth 43 and 44 are formed at the lower ends of curved or arcuate shanks 43' and 44', which are slidably mounted in correspondingly curved or arcuate guide-ways 48 and 49 formed in the body of the case 42. Pins 50 and 51 have their inner ends fastened to the shanks 43' and 44' of the dog teeth 43 and 44, and project laterally therefrom. The pin 50 overlies the upper end of the dog-operating bar 45, whereas the pin 51 extends through a vertical slot 45' provided in the dog-operating bar 45 near its lower end. Both pins 50 and 51 project through and beyond vertical slots 46' provided in the face plate 46 of the upper dog case. Coil springs 52 and 53 are provided for biasing the upper dog teeth 43 and 44 outwardly, the upper ends of these springs being fastened to the pins 50 and 51, and their lower ends being anchored on fixed pins 50' and 51' threadedly connected or otherwise suitably fixed to and projecting from the face plate 46 of the case 42 of the upper dog 21.

The side of the body of the upper dog case 42 opposite its face plate 46 has integrally formed therewith or otherwise suitably fixed thereto upper and lower flanged channel formations 55 and 55', similar to the flanged channel formation 26 of the lower dog case; and like it the flanged channel formations 55 and 55' slidably embrace the dog bar 12. Hence, the channel formations 55 and 55' also function as guides and constrain the upper dog case 42 to vertical sliding movement on the dog bar 12.

A fluid pressure motor, designated generally at

M', is provided for the purpose of retracting the upper dog teeth 43 and 44. This motor preferably comprises a fixed piston 56, which has its lower end secured to or supported on a bracket or lug 57, which may be formed integral with the face plate 46 of the upper dog case 42, or otherwise suitably rigidly connected therewith. A movable cylinder 58 is fitted over the piston 56 and has integral with its upper end an apertured lug 59.

A wrist pin 60 has its intermediate portion fitted in the aperture of the lug 59 and its inner end threadedly connected or otherwise suitably secured to the dog-operating bar 45. The wrist pin 60 has a collar-like enlargement 62 integral therewith and disposed between the lug 59 and the bar 45 and operating in a vertical slot 60' provided in the face plate 46 of the upper dog case 42. A nut 61 is threaded on the outer end of the wrist pin 60, which outer end projects beyond the lug 59.

When fluid under pressure is supplied to the working chamber of the motor M', that is to the space between the upper end of the piston 56 and the upper end head of cylinder 58, the cylinder 58 is forced upwardly and acts through wrist pin 60 to raise the dog-operating bar 45. The upward sliding movement thus imparted to bar 45 is transmitted through the pins 50 and 51 to the shanks 43' and 44' of dog teeth 43 and 44, and as a consequence these dog teeth 43 and 44 are retracted or moved inwardly toward the face of the knee. The movement of the dog shank 43' and 44' tensions the springs 52 and 53, and when pressure in the motor M' is relieved or exhausted, the springs act to project the upper dog teeth 43 and 44, this action of the springs supplementing, of course, the weight of the parts. By having the dog shanks 43' and 44' interconnected with the dog-operating bar 45 through the pins 50 and 51 in the manner described, they are protected against injury in the event a log is thrown against them in their projected position, since, upon such occurrence they are free to move inwardly against the action of their springs 52 and 53.

The present invention proposes to operate the motors M and M' in a certain special way, and in a controlled sequence, in order to make it impossible for the sawyer to retract the upper dog teeth 43 and 44 without the lower dog tooth 23 having been previously pulled in as far as it may be toward the face of the knee.

In carrying out this purpose a fluid pressure supply line 65 is connected up to one end of the cylinder 27 so as to supply fluid under pressure to the side of the piston opposite that on which the spring 31 is located. When fluid under pressure is admitted to the cylinder through the pressure line 65, the piston 28 is moved rearwardly and the lower dog tooth 23 is retracted. After this has been done, and the piston has traveled sufficiently rearwardly to uncover a port 66 in the cylinder 27 then the fluid under pressure flows through a flexible hose line 67 leading from port 66 to a passage 67' extending through the piston 56 and acts on the under side of the head of the cylinder 58 to move the cylinder 58 upwardly and effect the operation above described.

Fluid under pressure is supplied to and exhausted from the opposite ends of the cylinder 36 of the fluid pressure motor F through pipe lines 80 and 81. These pipe lines have open communication with passages 82 and 83, respectively, which lead to the interior of the cylinder, and which are provided with suitable throttling devices 84 and 85 which may take the form of plugs or screws. On the pipe line side of each throttling device branch passages 86 and 87 extend from the passages 82 and 83 to the interior of the cylinder, and are provided with ball check valves 88 biased to closed position by springs 89.

By virtue of the provision of the throttling devices the exhaust may be regulated or controlled, and yet, due to provision of the check valve control passages, fluid under pressure may be supplied to one side or the other of the piston under the desired pressure. This enables the dog to operate with a fast up stroke and a relatively slow down stroke to enable the dogging action to be carried out with rapidity but without damage to the lumber.

When the upper and lower dogs 21 and 22 are to be moved into engagement with a log or board, fluid under pressure is supplied to the upper end of the cylinder 36 of the fluid pressure motor F, and is exhausted from the lower end thereof. The fluid under pressure thus supplied acts on the top side of the piston 37, first to force it and the upper dog 21 downwardly, this action being aided by the weight of the piston 37 and its piston rod 38 and the upper dog. The upper dog moves downwardly until one of its teeth engages a log or board. Such engagement arrests further downward movement of the upper dog whereupon the fluid under pressure in the space between the top side of the piston 37 and an upper end head 39 of the cylinder 36 acts to raise the cylinder 36 and thereby move the lower dog tooth 23 up into engagement with the under side of the log or board. Thereafter the force with which the upper and lower dogs engage the log or board is equalized.

When the dogs 21 and 22 are to be disengaged from the log or board fluid under pressure is supplied to the lower end of the cylinder 36 and is exhausted from the upper end thereof. Fluid under pressure supplied the lower end of the cylinder first acts to force the cylinder 36 downwardly, this action being aided by the weight of the cylinder and of the lower dog.

The downward movement of the lower dog is limited by virtue of the provision of a bumper, designated generally at 90 (see Figures 3 and 4). The bumper 90 includes a fixed casing 91, which may be cast integral with the lower end of the cylinder, and which has its upper end closed by an integral apertured end wall 92, and its lower end open. A cushioning member, such as a rubber cylinder 93, is received in the casing, and has its upper end engaged with the apertured upper end wall 92 of the casing, while its lower end terminates short of the lower end of the casing. A metallic bumper proper, designated at 94, is provided, and is in the form of a cylinder, which is disposed partly within and partly below the casing 91. The part of the metal cylinder 94 within the casing is slidably fitted therein. A stem 95 has its lower end fixed to the upper end of the cylindrical metal bumper 94 and projects up through the opening in the upper end wall 92 of the casing. A nut 96 is threaded on a portion of the upper end of the stem 95 which projects above the end wall 92. The lower end of the cylindrical metal bumper 94 is rounded, as at 94', and is engageable with a portion of the bracket 13 to limit the extent to which the lower dog may be moved downwardly.

When the downward movement of the lower dog is arrested by the engagement of the bumper 94 with the bracket 13, the fluid under pressure in the lower end of the cylinder acts to force the piston 37 upwardly, thereby disengaging the upper dog from the log or board.

While I have shown and described one construction in which the invention may be advantageously embodied, it is to be understood that the construction shown has been selected merely for the purpose of illustration or example, and that various changes in the size, shape, and arrangement of the parts may be made without departing from the scope of the claims.

I claim:

1. A saw mill dog of the character described comprising upper and lower dogs supported for in and out movement, individual fluid pressure motors operatively interrelated with the upper and lower dogs for moving the same in and out, means for supplying fluid under pressure to the motor for the lower dog to cause the motor for the lower dog to move the lower dog inwardly, and a connection leading directly from the working chamber of the motor for the lower dog to the working chamber for the motor of the upper dog and effective to supply fluid under pressure to the working chamber of the motor for the upper dog after the motor for the lower dog has moved the lower dog inwardly.

2. A saw mill dog of the character described comprising upper and lower dogs supported for in and out movement, individual fluid pressure motors operatively interrelated with the upper and lower dogs for moving the same in and out, means for supplying fluid under pressure to the motor for the lower dog to cause the motor for the lower dog to move the lower dog inwardly, an unobstructed connection between the working chamber of the motor for the lower dog and the working chamber for the motor of the upper dog effective to conduct fluid under pressure to the working chamber of the motor for the upper dog after the motor for the lower dog has moved the lower dog inwardly, said motor for the lower dog including a piston, and a cylinder, with the piston so related to said connection as to function as a valve for controlling flow of fluid under pressure through said connection.

3. A saw mill dog comprising movably supported upper and lower teeth, individual fluid pressure motors for said teeth, a source of fluid under pressure, one of said motors being connected to said source, the other of said motors being connected to said first mentioned motor so that fluid under pressure supplied to said second mentioned motor must pass through said first mentioned motor.

MARTIN KAHR.